US008558415B2

(12) United States Patent
Fujita et al.

(10) Patent No.: US 8,558,415 B2

(45) Date of Patent: Oct. 15, 2013

(54) SAFETY DEVICE AND POWER CONVERTER

(75) Inventors: Kenji Fujita, Tokyo (JP); Ikuya Sato, Tokyo (JP); Hiroshi Takahashi, Tokyo (JP); Yuichi Takami, Mie (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 363 days.

(21) Appl. No.: 12/801,811

(22) Filed: Jun. 25, 2010

(65) Prior Publication Data

US 2010/0327667 A1 Dec. 30, 2010

(30) Foreign Application Priority Data

Jun. 26, 2009 (JP) ................................ 2009-153013

(51) Int. Cl.
*G05B 9/02* (2006.01)
*H02H 11/00* (2006.01)

(52) U.S. Cl.
USPC .......................................... 307/326; 318/563

(58) Field of Classification Search
USPC .......................................... 307/326; 318/563
See application file for complete search history.

(56) References Cited

U.S. PATENT DOCUMENTS 6,573,681 B2 * 6/2003 Schwesig ...................... 318/801
7,253,577 B2 8/2007 Campbell et al.
2005/0122641 A1 * 6/2005 Fullington et al. .............. 361/23
2010/0156435 A1 * 6/2010 Kangas ......................... 324/538
2011/0215751 A1 * 9/2011 Sato ............................. 318/490

* cited by examiner

*Primary Examiner* — Adi Amrany
(74) *Attorney, Agent, or Firm* — Rabin & Berdo, P.C.

(57) ABSTRACT

Whether a safety function unit having a safety function of a desired standard is correctly mounted in a safety device having a configuration in which a basic control function and safety function are separated is accurately determined. The safety device includes a controller and the safety function unit. The controller is provided with a unit which selects a category for identifying a safety function unit which should be connected, a unit which transmits a reference signal to the safety function unit, a unit which determined, based on a category identification signal returned from the safety function unit, whether or not the category of the connected safety function unit coincides with a selected category, and a unit which, in the event that the result of the determination is such that the category of the connected safety function unit and the selected category do not coincide, prohibits the output of a control signal. The safety function unit is provided with a unit which, based on the reference signal transmitted from the controller, generates the category identification signal in accordance with a process appropriate to the category of the safety function unit, and returns it to the controller.

8 Claims, 14 Drawing Sheets

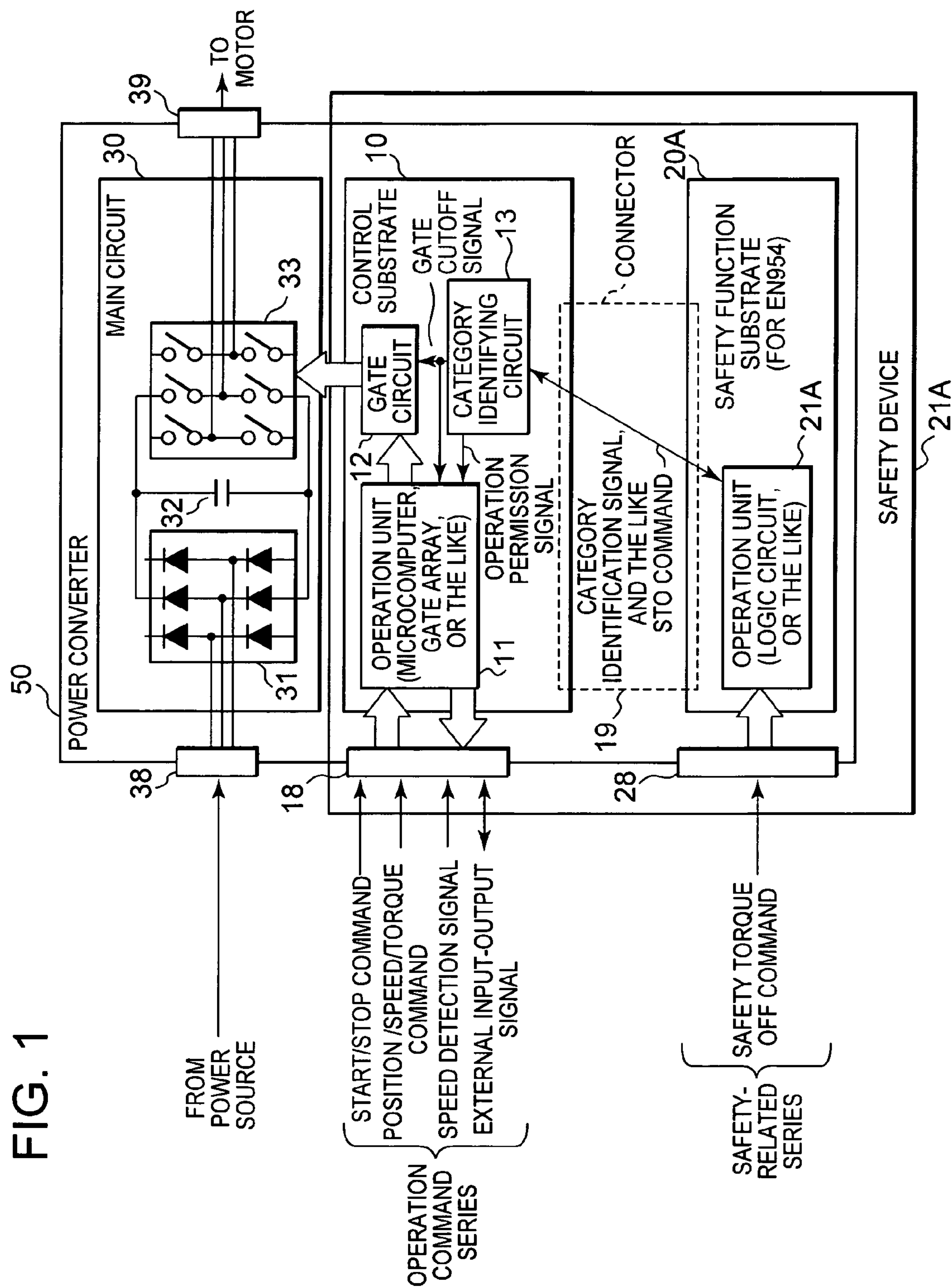
FIG. 1
FROM POWER SOURCE
TO MOTOR
39
38
50
POWER CONVERTER
30
MAIN CIRCUIT
31
32
33
10
CONTROL SUBSTRATE
GATE CUTOFF SIGNAL
13
CATEGORY IDENTIFYING CIRCUIT
GATE CIRCUIT
12
OPERATION UNIT (MICROCOMPUTER, GATE ARRAY, OR THE LIKE)
11
OPERATION PERMISSION SIGNAL
CONNECTOR
CATEGORY IDENTIFICATION SIGNAL, AND THE LIKE
STO COMMAND
19
20A
SAFETY FUNCTION SUBSTRATE (FOR EN954)
21A
OPERATION UNIT (LOGIC CIRCUIT, OR THE LIKE)
SAFETY DEVICE
21A
18
28
START/STOP COMMAND
POSITION /SPEED/TORQUE COMMAND
SPEED DETECTION SIGNAL
EXTERNAL INPUT-OUTPUT SIGNAL
OPERATION COMMAND SERIES
SAFETY TORQUE OFF COMMAND
SAFETY-RELATED SERIES

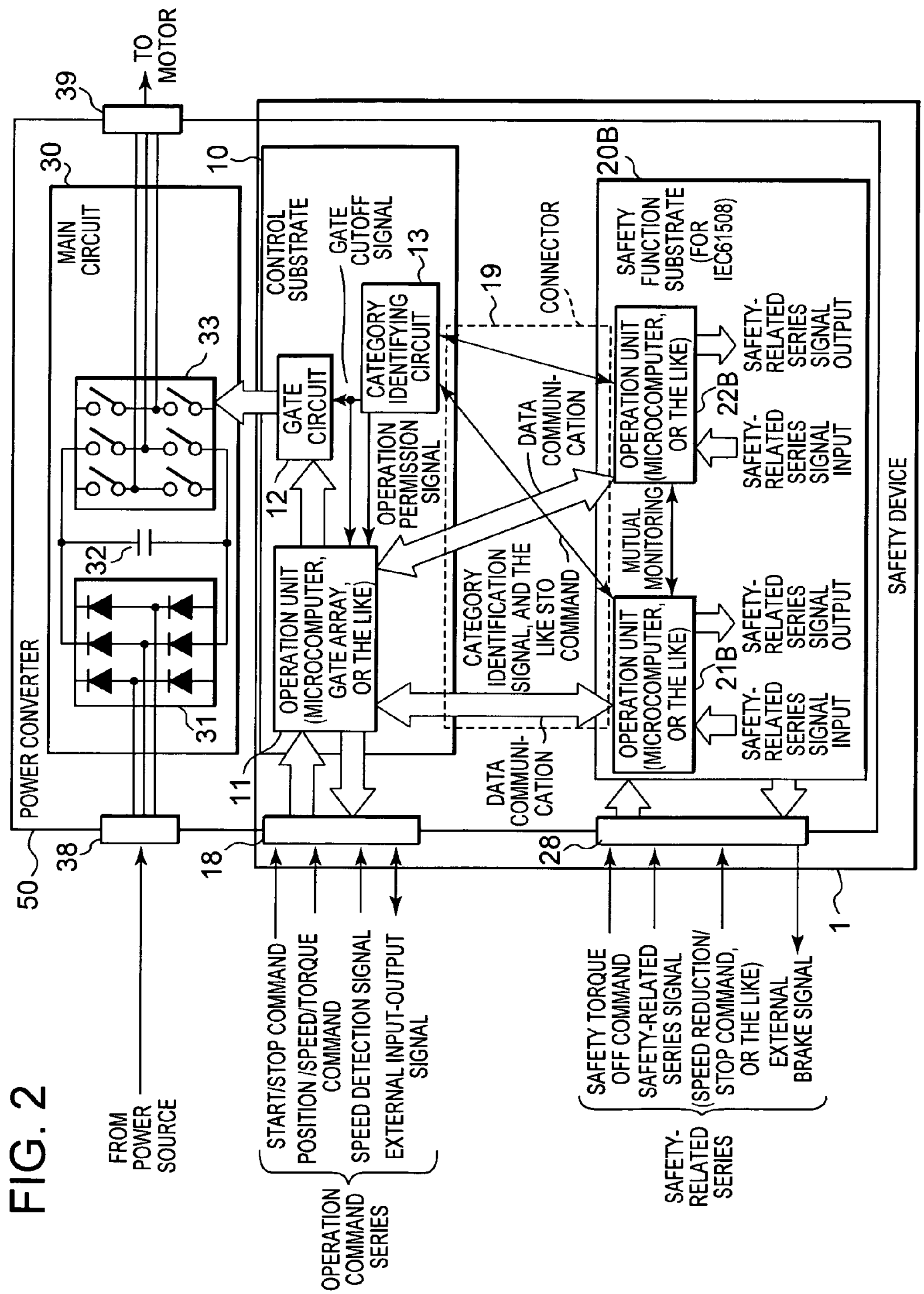
FIG. 2
FROM POWER SOURCE
TO MOTOR
POWER CONVERTER
MAIN CIRCUIT
CONTROL SUBSTRATE
GATE CUTOFF SIGNAL
GATE CIRCUIT
CATEGORY IDENTIFYING CIRCUIT
OPERATION PERMISSION SIGNAL
OPERATION UNIT (MICROCOMPUTER, GATE ARRAY, OR THE LIKE)
CONNECTOR
DATA COMMUNI-CATION
CATEGORY IDENTIFICATION SIGNAL, AND THE LIKE STO COMMAND
DATA COMMUNI-CATION
SAFETY FUNCTION SUBSTRATE (FOR IEC61508)
OPERATION UNIT (MICROCOMPUTER, OR THE LIKE)
MUTUAL MONITORING
OPERATION UNIT (MICROCOMPUTER, OR THE LIKE)
SAFETY-RELATED SERIES SIGNAL OUTPUT
SAFETY-RELATED SERIES SIGNAL INPUT
SAFETY-RELATED SERIES SIGNAL OUTPUT
SAFETY-RELATED SERIES SIGNAL INPUT
SAFETY DEVICE
START/STOP COMMAND
POSITION /SPEED/TORQUE COMMAND
SPEED DETECTION SIGNAL
EXTERNAL INPUT-OUTPUT SIGNAL
OPERATION COMMAND SERIES
SAFETY TORQUE OFF COMMAND
SAFETY-RELATED SERIES SIGNAL
(SPEED REDUCTION/ STOP COMMAND, OR THE LIKE)
EXTERNAL BRAKE SIGNAL
SAFETY-RELATED SERIES
1
10
11
12
13
18
19
20B
21B
22B
28
30
31
32
33
38
39
50

REFERENCE SIGNAL (TRANSMISSION)
(CONTROL SUBSTRATE TO SAFETY FUNCTION SUBSTRATE)
CATEGORY IDENTIFICATION SIGNAL (RETURN)
(SAFETY FUNCTION SUBSTRATE TO CONTROL SUBSTRATE)
RECEIVED SIGNAL A (CONTROL SUBSTRATE)
RECEIVED SIGNAL B (CONTROL SUBSTRATE)
OPERATION PERMISSION SIGNAL (CONTROL SUBSTRATE)
H

REFERENCE SIGNAL (TRANSMISSION)
(CONTROL SUBSTRATE TO SAFETY FUNCTION SUBSTRATE)
CATEGORY IDENTIFICATION SIGNAL (RETURN)
(SAFETY FUNCTION SUBSTRATE TO CONTROL SUBSTRATE)
L
RECEIVED SIGNAL A (CONTROL SUBSTRATE)
L
RECEIVED SIGNAL B (CONTROL SUBSTRATE)
L
OPERATION PERMISSION SIGNAL (CONTROL SUBSTRATE)
L

10
CONTROL SUBSTRATE
13
CATEGORY IDENTIFYING CIRCUIT
71
72
73
74
75
76
77
D Q Clock
D
E
F
G
COINCIDENCE DETERMINATION
GATE CUTOFF SIGNAL
OPERATION PERMISSION SIGNAL
61
SQUARE WAVE GENERATOR
19
CONNECTOR
STO COMMAND
CATEGORY IDENTIFICATION SIGNAL
REFERENCE SIGNAL
20B
SAFETY FUNCTION SUBSTRATE
OPERATION UNIT
T Q
91B
92B
21B

| A3 | A2 | A1 | A0 | D0 |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 1 |
| 0 | 1 | 0 | 0 | 0 |
| 0 | 1 | 0 | 1 | 0 |
| 0 | 1 | 1 | 0 | 1 |
| 0 | 1 | 1 | 1 | 0 |
| 1 | 0 | 0 | 0 | 0 |
| 1 | 0 | 0 | 1 | 1 |
| 1 | 0 | 1 | 0 | 0 |
| 1 | 0 | 1 | 1 | 0 |
| 1 | 1 | 0 | 0 | 1 |
| 1 | 1 | 0 | 1 | 0 |
| 1 | 1 | 1 | 0 | 0 |
| 1 | 1 | 1 | 1 | 0 |

("1" MEANS "H", "0" MEANS "L")

| A10 | · · | A3 | A2 | A1 | A0 | D0 |
|---|---|---|---|---|---|---|
| 0 | | 0 | 0 | 0 | 0 | 0 |
| 0 | | 0 | 0 | 0 | 1 | 0 |
| 0 | | 0 | 0 | 1 | 0 | 0 |
| 0 | | 0 | 0 | 1 | 1 | 1 |
| 0 | | 0 | 1 | 0 | 0 | 0 |
| 0 | | 0 | 1 | 0 | 1 | 0 |
| 0 | | 0 | 1 | 1 | 0 | 1 |
| 0 | | 0 | 1 | 1 | 1 | 0 |
| 0 | | 1 | 0 | 0 | 0 | 0 |
| 0 | | 1 | 0 | 0 | 1 | 1 |
| 0 | | 1 | 0 | 1 | 0 | 0 |
| 0 | | 1 | 0 | 1 | 1 | 0 |
| 0 | | 1 | 1 | 0 | 0 | 1 |
| 0 | | 1 | 1 | 0 | 1 | 0 |
| 0 | | 1 | 1 | 1 | 0 | 0 |
| 0 | | 1 | 1 | 1 | 1 | 0 |
| 1 | | 0 | 0 | 0 | 0 | 0 |
| 1 | | 0 | 0 | 0 | 1 | 0 |
| 1 | | 0 | 0 | 1 | 0 | 0 |
| 1 | | 0 | 0 | 1 | 1 | 0 |
| 1 | | 0 | 1 | 0 | 0 | 0 |
| 1 | | 0 | 1 | 0 | 1 | 1 |
| 1 | | 0 | 1 | 1 | 0 | 0 |
| 1 | | 0 | 1 | 1 | 1 | 0 |
| 1 | | 1 | 0 | 0 | 0 | 0 |
| 1 | | 1 | 0 | 0 | 1 | 0 |
| 1 | | 1 | 0 | 1 | 0 | 1 |
| 1 | | 1 | 0 | 1 | 1 | 0 |
| 1 | | 1 | 1 | 0 | 0 | 0 |
| 1 | | 1 | 1 | 0 | 1 | 0 |
| 1 | | 1 | 1 | 1 | 0 | 0 |
| 1 | | 1 | 1 | 1 | 1 | 0 |

("1" MEANS "H", "0" MEANS "L")

10
CONTROL SUBSTRATE
13
CATEGORY IDENTIFYING CIRCUIT
GATE CUTOFF SIGNAL
OPERATION PERMISSION SIGNAL
77
80
76
D Q Clock
78
SELECTION CIRCUIT
COINCIDENCE DETERMINATION
A10 A7 A3 A2 A1 A0
D1 D2
79
D Clock Q0 Q1 Q2 Q3 Q7
61
SQUARE WAVE GENERATOR
19
CONNECTOR
CATEGORY IDENTIFICATION SIGNAL
REFERENCE SIGNAL
20B
OPERATION UNIT
SAFETY FUNCTION SUBSTRATE
21B
94B
91B 92B 93B
T Q
STO COMMAND

SAFETY DEVICE AND POWER CONVERTER

CROSS-REFERENCE TO RELATED APPLICATION

This application claims the benefit of priority of Japanese patent application number 2009-153013, filed on Jun. 26, 2009, the disclosure of which is incorporated herein by reference.

BACKGROUND OF THE INVENTION

The present invention relates to a technology which constructs a safety device compliant with various kinds of safety standards, and in particular, it relates to a safety device for a power converter such as an inverter or servo amplifier which drives a motor, or for an instrument to be controlled by a programmable logic controller (PLC), or the like.

In recent years, due to the necessity of saving energy, a power converter which drives a motor at variable speeds has become popular. Since abnormal operation of an electrical instrument can lead to a serious accident, improvements in safety are being demanded. Also, strict safety standards are established in order to keep the danger to the human body at each step of product development, design, production, maintenance, and disposal within a tolerance range.

As a widespread safety standard, for example, ISO13849 is stipulated. In particular, relating to electrical instruments, there is a safety standard called IEC61508, and a subordinate standard called IEC61800-5-2, which governs motor control devices such as inverters or servo amplifiers. In Japan, the development of motor control devices compliant with these international standards is being actively pursued.

Also, in Europe, motor control devices compliant with the IEC61800-5-2 standard are coming onto the market. In order to comply with these safety standards, it is necessary not only to document the development structure and concept, and to receive certification of whether or not the safety standards are complied with, but also to monitor for an abnormality of a controlled instrument or of a control device and, in the event that an abnormality is detected, to safely stop the controlled instrument in accordance with specifications.

This kind of safety standard is reviewed from time to time, and every time it is, enormous development costs and time are needed to newly develop a control device (hereafter called a "safety device") which has a safety function. Also, as the level of safety standard needed, and the environment in which a controlled instrument is used, vary depending on the client, it is necessary to provide a safety device appropriate to the safety level required by each individual client. For these reasons, consideration is given to separating control functions and safety functions, and achieving a reduction in development costs and a contraction of the development period by developing only a portion which needs to be dealt with individually.

As a heretofore known technology relating to safety functions, for example, a safety device provided with a safety function unit which, being independent of a controller which generates a control signal for driving a motor, carries out abnormality monitoring of the controller, is described in U.S. Pat. No. 7,253,577. The safety device, when an abnormality in the device is detected by the safety function unit, causes the motor to stop by interrupting a control signal output from the controller to the subject of control.

However, although it is described in the heretofore known technology that a controller with a control function and a safety function unit with a safety function are provided independently, a plurality of kinds of safety function units exist, and no consideration is given to configuring a safety device by combining each kind of safety function portion and the controller. In the event that a plurality of kinds of safety function units exist, it is envisaged that a safety function required of a controlled instrument does not operate due to an error in the operation of attaching or removing a safety function unit, or to a combination error. In order to avoid a dangerous situation occurring due to this kind of non-operation of a safety function, it is necessary to accurately determine that the correct safety function unit is correctly connected in the combination.

SUMMARY OF THE INVENTION

The invention has been made under the above-mentioned circumstances, and an object of the invention is to provide a safety device and power converter which can accurately determine that a safety function unit bearing a safety function of a desired standard is correctly mounted, with the safety device having a configuration wherein a control function and a safety function are separated.

A safety device according to the invention, basically including the below-mentioned units, is configured of a controller which generates a control signal for controlling an controlled instrument, and a safety function unit, connected to the controller, which executes a predetermined safety function.

The controller and safety function unit may both be realized with substrates, mounted on one unit, and carry out an exchange of identification signals using a dedicated cable or an internal bus, or they may each be configured as a single device or module, and connected by a dedicated cable.

The controller has the following units a to d as basic functions.

a. A unit which selects a category for identifying a safety function unit which should be connected.

The category has a meaning as identification information of the safety function unit, but is not limited to this. For example, in the event that a safety function unit is provided for each safety standard (or safety function), it also has a meaning as identification information of the safety standard (safety function). Provided that it can at least identify the safety function unit, it is included in "category".

b. A unit which transmits to the safety function unit a reference signal for generating a category identification signal which enables a category identification.

c. A unit which, based on the category identification signal returned from the safety function unit, determines whether or not the category of the connected safety function unit coincides with the category selected in a. above, and outputs the result of the determination.

d. A unit which, in the event that the result of the determination is such that the category of the connected safety function unit and the category selected in a. above do not coincide, prohibits the output of the control signal.

Also, the safety function unit has the following unit e.

e. A unit which, based on the reference signal transmitted from the controller, generates the category identification signal in accordance with a process appropriate to the category of the safety function unit, and returns it to the controller.

That is, in the invention, a reference signal is transmitted from the controller to the safety function portion. In the safety function portion, based on the reference signal, a category identification signal is generated in accordance with a process unique to the safety function unit, and returned to the controller. In the controller, it is determined whether or not the pattern of the category identification signal (hereafter called the "signal pattern") coincides with the signal pattern of a pre-selected category and, in the event that they do not coincide, the output of the control signal is prohibited.

As a way of generating the category identification signal, for example, there is a method whereby a continuous fixed-cycle signal is transmitted from the controller to the safety function unit as the reference signal, and the safety function unit, using the fixed-cycle signal, generates the category identification signal by reducing the frequency under a predetermined frequency reduction condition. The frequency reduction condition (for example, reducing to one half, reducing to one quarter, or the like) is uniquely decided in accordance with the category of the safety function unit.

The controller determines whether or not the cycle of the returned category identification signal and the cycle fixed in accordance with the pre-selected category coincide and, in the event that they do not coincide, assumes that the pre-selected category of safety function unit is not mounted, and locks the control signal.

As another way of generating the category identification signal, instead of employing the frequency reduction condition, the generation of the category identification signal may also be delayed under a time or phase condition appropriate to the category of the safety function unit.

Also, the safety function unit, in the event that it becomes necessary to immediately stop the controlled instrument due to an input from the exterior or an abnormality monitoring function, may transmit a stop request signal to the controller on a dedicated signal line, but may also generate a signal differing from the original category identification signal generated in accordance with the process appropriate to the category, and return the signal to the controller as a category identification signal. Because of this, as the controller assumes that the correct safety function unit is not mounted, and prohibits the output of the control signal, it is possible to obtain an equivalent advantage with fewer signal lines.

It is preferable that the confirmation of whether or not the safety function unit is mounted normally is carried out at intervals of a time shorter than the required operating time of a safety function required of the controlled instrument. The controller transmits the reference signal to the safety function unit at these time intervals and, by carrying out a confirmation every time based on the category identification signal returned from the safety function unit, can carry out the locking of the control output with appropriate timing when there is an abnormality.

According to the invention, as the configuration is such that the controller and safety function unit are separated, it is possible to achieve a reduction in development costs and a contraction of a development period. In particular, as the controller does not output the control signal to the controlled instrument in the event that there is no return from the safety function unit of a category identification signal of the same category as the pre-selected category, it is possible to prevent a non-operation or malfunction of the safety function caused by separating the controller and safety function unit.

Also, as a dedicated safety function unit is provided for each category of safety function, it is possible to efficiently realize the safety function. Furthermore, it is possible to respond flexibly, even in the event of an increase in safety function categories due to a revision of a standard or a diversification of client requests.

BRIEF DESCRIPTION OF THE DRAWINGS

FIG. 1 is a functional block diagram of a power converter including a safety device according to an embodiment of the invention;

FIG. 2 is a functional block diagram of the power converter including the safety device of FIG. 1, on which another safety function substrate is mounted;

FIG. 11A is a circuit diagram in a case of realizing the coincidence determination circuit with an ROM, and FIG. 11B is a diagram showing the relationship between addresses and data of the ROM of FIG. 11A;

FIG. 13A is a circuit diagram in a case of realizing the coincidence determination circuit with an ROM, and FIG. 13B is a diagram showing the relationship between addresses and data of the ROM of FIG. 13A.

DETAILED DESCRIPTION OF THE PREFERRED EMBODIMENTS

Figure 3:
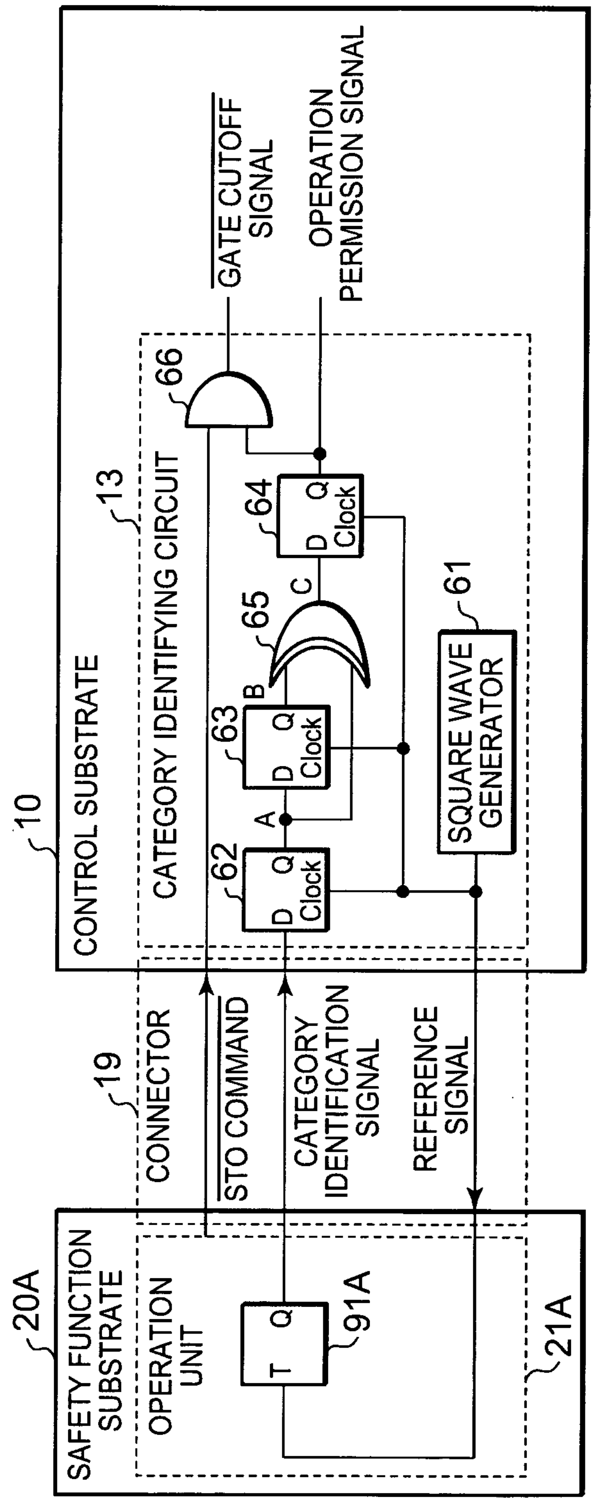
FIG. 3 is a circuit configuration diagram of a category identifying circuit according to a Working Example 1.

Hereafter, a description will be given of an embodiment of the invention, with a power converter which drives a motor as a control object as an example.

FIG. 1 is a functional block diagram of a power converter including a safety device according to an embodiment of the invention. In FIG. 1, a power converter 50 includes a main circuit 30 which, using semiconductor switching elements, generates an alternating current of a predetermined frequency, and outputs it to a motor which is a control object, a control substrate 10, which outputs to the main circuit 30 control signals for causing the semiconductor switching elements to operate, and a safety function substrate 20A, used connected to the control substrate 10, which carries out a monitoring for an abnormality, and the like. A safety device 1 is configured of the control substrate 10 and safety function substrate 20A.

The configuration shown in FIG. 1 is such that the safety device 1 is configured of a plurality of substrates, but the invention not being limited to this, it is also possible to realize the safety device 1 as a plurality of devices or modules.

Next, a functional outline of the power converter 50 will be described.

In the main circuit 30 of the power converter 50, an alternating current is input from a power source via a connector 38. The current is rectified by a rectifying circuit 31 and a smoothing capacitor 32, and an alternating current is generated by the semiconductor switching elements of a switching circuit 33 being turned on and off in accordance with the control signal passed from the control substrate 10. The alternating current is sent to the motor via a connector 39.

The control substrate 10 includes an operation unit 11 which, as its basic function, carries out control of the main circuit 30. The operation unit 11 receives a start/stop command and a position/speed/torque command from the exterior and, based on an input signal such as a motor speed detection signal, generates the control signal for causing the switching circuit 33 of the main circuit 30 to operate. The generated control signal is transmitted to the main circuit 30 via a gate circuit 12.

A plurality of safety function substrates with differing safety functions are connectable to the control substrate 10 via a connector 19. As the safety function substrates connected to the control substrate 10, there is the safety function substrate 20A, which has only a safe torque off function which complies with a safety standard such as ISO13849 or EN954, a safety function substrate 20B (see FIG. 2), which has safety functions such as a safe torque off or speed limiting function, which comply with IEC61508 or IEC61800-5-2, and the like. Hereafter, a description will be given with the two kinds of safety function substrate 20A and 20B as examples.

Next, a description will be given of the operation of the safety device 1 with the heretofore described configuration.

In FIG. 1, the control substrate 10, on an operation command series signal being input from the exterior, executes operation for controlling the motor with a processor such as a microcomputer. As the operation command series signal from the exterior, there are the start/stop command, the position, speed, torque commands, and the like. The operation unit 11 of the control substrate 10 carries out feedback control by individually detecting the angle of rotation and current of the motor with sensors such as an encoder and current transformer (CT), and outputs the control signal for controlling the semiconductor elements of the switching circuit 33 of the main circuit 30. Apart from a processor, the operation unit 11 can also be realized with an integrated logic circuit such as a gate array. As the feedback control function is not a subject of the invention, a depiction of the function in the drawings, and a detailed description thereof, are omitted.

The control substrate 10 includes a category identifying circuit 13 for identifying the substrate category of the connected safety function substrate. The category identifying circuit 13 determines the mounting status of the safety function substrates 20A and 20B connected to the control substrate 10 and, based on the mounting status, generates an operation permission signal permitting the operation unit 11 to execute a control operation.

The operation permission signal output from the category identifying circuit 13 is input into the operation unit 11. The operation unit 11 executes a control operation by detecting the operation permission signal, and outputs a control signal. The control signal is transmitted to the gate circuit 12. The gate circuit 12 transmits the control signal for controlling the semiconductor switching elements to the main circuit 30, causing the semiconductor switching elements of the switching circuit 33 to operate, only in the event that the semiconductor switching element operation permission signal has been input.

Also, the category identifying circuit 13 determines whether or not the safety function substrates 20A and 20B which should be connected are connected and, in the event that they are not correctly connected, outputs a gate cutoff signal to the gate circuit 12. The gate circuit 12, on receiving the gate cutoff signal, compulsorily turns off the control signal to the main circuit 30 output from the operation unit 11, carrying out a gate cutoff.

Also, in the event that a safe torque off (hereafter referred to as STO) command is input into the safety function substrate 20A, an operation unit 21A of the safety function substrate 20A outputs the STO command as a safety function substrate 20A status signal. The STO command is transmitted to the category identifying circuit 13 of the control substrate 10 via an internal bus or connection cable. On the STO command being input, the category identifying circuit 13 of the control substrate 10 transmits a gate cutoff signal to the gate circuit 12. The gate circuit 12, on receiving the gate cutoff signal, compulsorily cuts off the control signal from the operation unit 11. Also, on the gate cutoff signal output from the category identifying circuit 13 being input as the status, the operation unit 11 detects that the STO command has been output by comparing the status with the status of the operation permission signal.

Because of this, as it is possible to independently implement the STO function without going through the operation unit 11 of the control substrate 10, the safety device 1 can reliably interrupt the control signal for controlling the semiconductor switching elements, even in the event that the operation unit 11 behaves unexpectedly or fails.

Although not shown, it is also possible to duplicate the gate circuit 12 in the configuration of the control substrate 10 of FIG. 1. In addition to the duplication of the gate circuit, furthermore, it is also possible to receive an ISO13849-1 safety standard (the European standard is EN954-1) certification by documenting the development process.

The safety function substrate 20B shown in FIG. 2 is an example of duplicating the monitoring function by providing two operation units. Operation units 21B and 22B of the safety function substrate 20B each have the function of monitoring the operation of the control substrate 10. Also, the safety function substrate 20B includes a terminal 28 which, apart from inputting an STO command, inputs as a safety function a safety-related series signal such as a command to stop the motor after reducing the rotation speed (hereafter referred to as a speed reduction/stop command), or a speed limit command which determines a maximum speed.

On a safety-related series signal such as the speed reduction/stop command being input into the safety function substrate 20B, the safety-related series signal is transmitted to the operation unit 11 of the control substrate 10 by means of data communication such as serial communication or parallel communication. The control substrate 10 controls the motor based on the transmitted safety-related series command signal.

Also, the safety function substrate 20B monitors whether the operation unit 11 of the control substrate 10 is operating normally and, on detecting that it has deviated from the normal operation, notifies the control substrate 10 of the abnormal condition. The category identifying circuit 13 of the control substrate 10, on receiving the abnormal condition notification, transmits a gate cutoff signal to the gate circuit 12.

Because of this, as the gate cutoff is possible without going through the operation unit 11 of the control substrate 10, even in the case of operating based on a safety-related series signal, it is possible to promptly cut off the gate even in the event that the operation unit 11 of the control substrate 10 behaves unexpectedly.

As the operation units 21B and 22B of the safety function substrate 20B are duplicated, it is possible for one to detect an abnormality in the other operation unit mounted on the safety function substrate 20B. Because of this, a gate cutoff signal is transmitted to the gate circuit 12 via the category identifying circuit 13 not only when the STO command is input into the safety function substrate 20B, but also when an abnormality in the other operation unit is detected, and it is possible to compulsorily interrupt the control signal output from the operation unit 11.

Also, it is possible to provide the safety function substrate 20B with a brake signal, and an output signal which operates, or the like, an external mechanical switch.

In FIG. 2, the configuration of the safety function substrate 20B is shown simplified, but the invention is not limited to this. For example, it is possible to adopt various configurations, such as a duplicated function like a control power source or clock, or a mutual monitoring function, in accordance with the safety requirement level of an international standard.

Working Example 1

Next, using FIG. 3, a description will be given of the category identifying circuit 13 according to a working example 1 of the safety device 1 with the heretofore described substrate configuration. The category identifying circuit 13 according to the working example transmits and receives, via a designated line, a square wave continuous signal as a signal for identifying the category transmitted by the control substrate 10. In the working example, a case in which a return signal received by the control substrate 10 is of a cycle twice that of a transmitted signal (that is, a cycle of the return signal is twice as long as a cycle of the transmitted signal) is determined to mean that an appropriate substrate is connected.

Hereafter, an operation of the category identifying circuit 13 will be described in detail. The control substrate 10, firstly, transmits a signal generated by a square wave generator 61 to the safety function substrate 20A. The signal acts as a reference signal when a category identification signal for identifying the safety function substrate is generated by the safety function substrate 20A.

The safety function substrate 20A generates the category identification signal by changing the pulse of the reference signal to a cycle twice as long with a logic circuit such as a T flip-flop 91A, and returns it to the control substrate 10. A D flip-flop 62 of the control substrate 10, with the rising edge of the transmission signal as a trigger, holds the returned category identification signal. Also, a D flip-flop 63 of the control substrate 10 receives an output signal of the D flip-flop 62, and holds the category identification signal of an immediately preceding clock. As an EX-OR circuit 65 outputs at an H level in the event that the output of only one of the D flip-flops 62 and 63 is at the H level, the output of the EX-OR circuit 65 is constantly at the H level when the received signal is of a cycle twice that of the transmitted signal. The output of the EX-OR circuit 65 is shaped by a D flip-flop 64, generating an operation permission signal (positive logic). Also, an STO command (negative logic) passed from the safety function substrate 20A, and the operation permission signal, both being inputs of an AND circuit 66, the output of the AND circuit 66 is a gate cutoff signal (negative logic).

Figure 4:
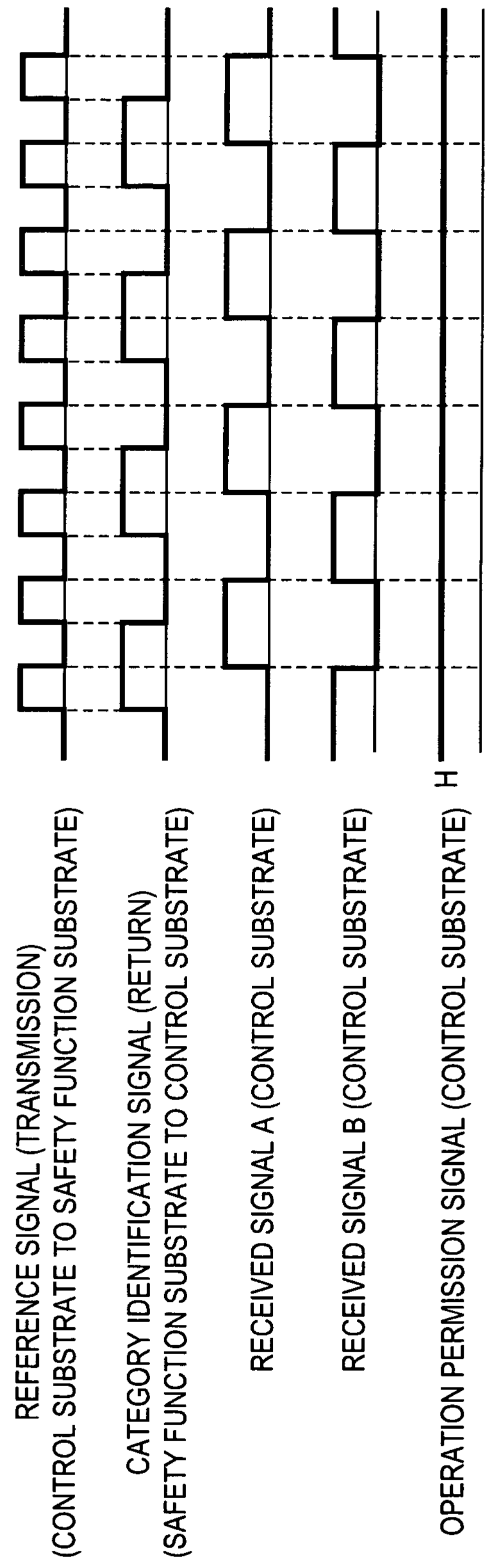
FIG. 4 is an illustration of an example of operational waveforms when an appropriate safety function substrate is connected in FIG. 3.

FIG. 4 is an example of operational waveforms when the appropriate safety function substrate 20A is connected in the circuit configuration shown in FIG. 3. A category identification signal with a cycle twice that of the reference signal is detected by the category identifying circuit 13 according to the working example, and the operation permission signal is at the H level.

Figure 5:
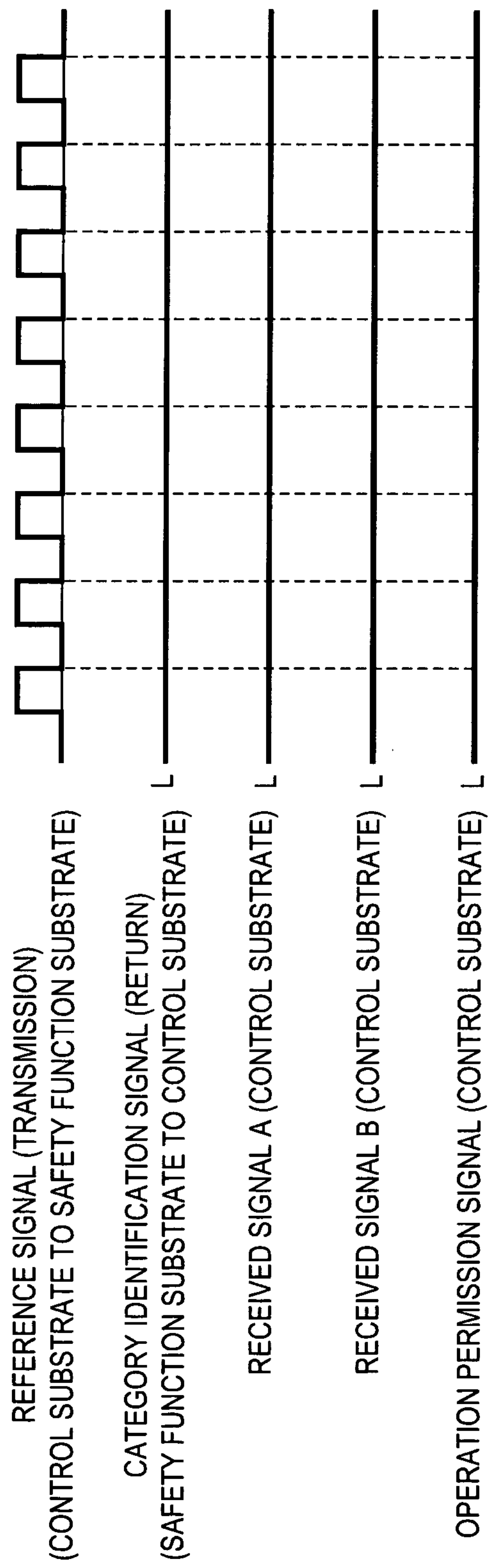
FIG. 5 is an illustration of an example of operational waveforms when the safety function substrate is not connected, or when there is an open fault in a transceiver circuit (signal lines), in FIG. 3.

FIG. 5 is an example of operational waveforms when the safety function substrate 20A is not connected in the circuit shown in FIG. 3. When the safety function substrate 20A is not connected, no category identification signal is returned to the control substrate 10, and the input signal does not change. In FIG. 5, the category identification signal is constantly at an L level. In this case, as the output values (A and B) of the D flip-flops 62 and 63 coincide, the output C of the EX-OR circuit 65, and the operation permission signal, are both at the L level. Also, the gate cutoff signal is also at the L level, regardless of the status of the STO command. The operation permission signal, being of a positive logic, is in an inactive condition (“false”), and the gate cutoff signal, being of a negative logic, is in an active condition (“true”).

Because of this, it is possible to detect that the safety function substrate is not connected normally, and it is possible to cut off the gate circuit 12. Also, the operation unit 11 can detect from the operation permission signal that the safety function is not working normally. Even in the event that an open fault occurs in the reference signal and category identification signal transmission system, the operation is the same, and it is possible to detect the abnormality.

Figure 6:
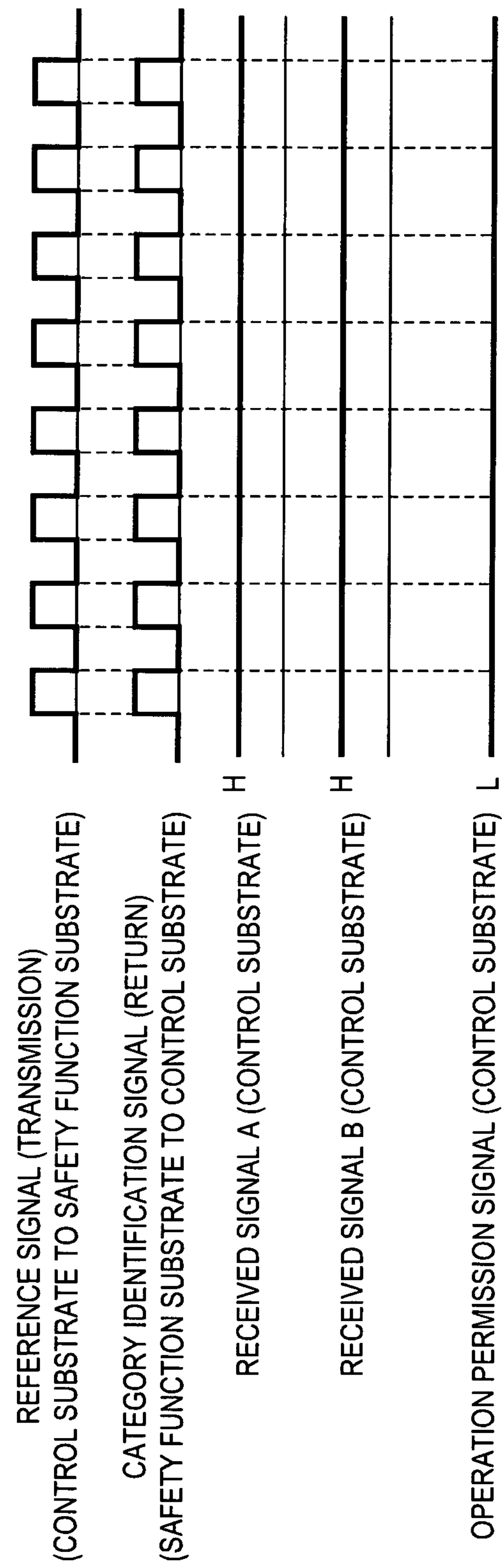
FIG. 6 is an illustration of an example of operational waveforms when the transceiver circuit (signal lines) in FIG. 3 is short circuited.

FIG. 6 is an example of operational waveforms when the transmission signal output and return signal input of the control substrate 10 in the circuit shown in FIG. 3 are short circuited. As the output values (A and B) of the D flip-flops 62 and 63 are fixed at the H level when the return signal is identical to the transmission signal, the output C of the EX-OR circuit 65, the operation permission signal, and the gate cutoff signal, are all at the L level. Because of this, it is possible to put the gate circuit 12 into the cut off condition.

Figure 7:
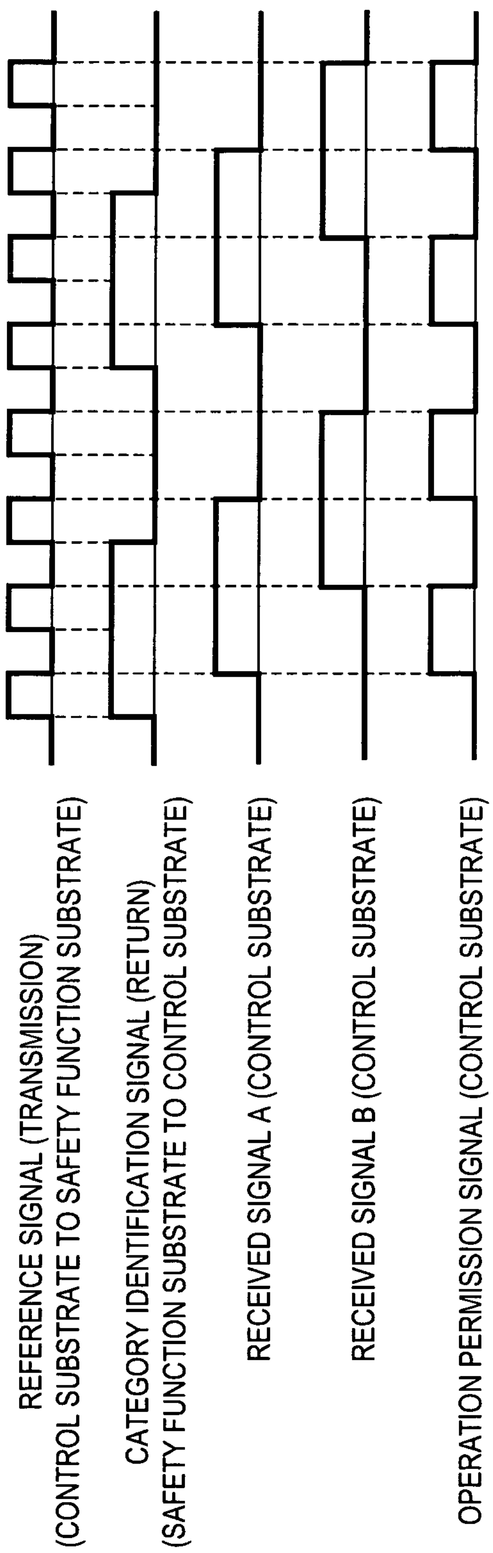
FIG. 7 is an illustration of an example 1 of operational waveforms when an inappropriate safety function substrate is connected in FIG. 3.

FIG. 7 is an example of operational waveforms when an inappropriate safety function substrate is connected to the control substrate 10 in the circuit shown in FIG. 3, and a category identification signal with a cycle four times that of the transmission signal is returned. In the category identifying circuit 13 of FIG. 3, the output values (A and B) of the D flip-flops 62 and 63 become identical, as shown in FIG. 7, when a signal with a cycle other than two times that of the reference signal is input. That is, a timing occurs whereat the output values are both at the H level, or both at the L level. For this reason, a timing occurs whereat the output C of the EX-OR circuit 65, the operation permission signal, and the gate cutoff signal are at the L level. Because of this, it is possible to detect an abnormality in the substrate connection, and it is possible to prohibit the operation of the semiconductor switching elements. Although, in FIG. 7, the operation permission signal is of a toggle type, when determining the substrate category by cycles wherein the reference signal frequency is reduced, by sampling data on the category identification signal with the relevant cycle for each reference signal in synchronization with the substrate category with the longest cycle, and determining whether or not the sampled data correspond to the signal pattern of the desired substrate category, it is possible to make the operation permission signal a stable signal which is constantly at the H level when the correct safety function substrate is mounted, and constantly at the L level when an incorrect safety function substrate is mounted.

Figure 8:
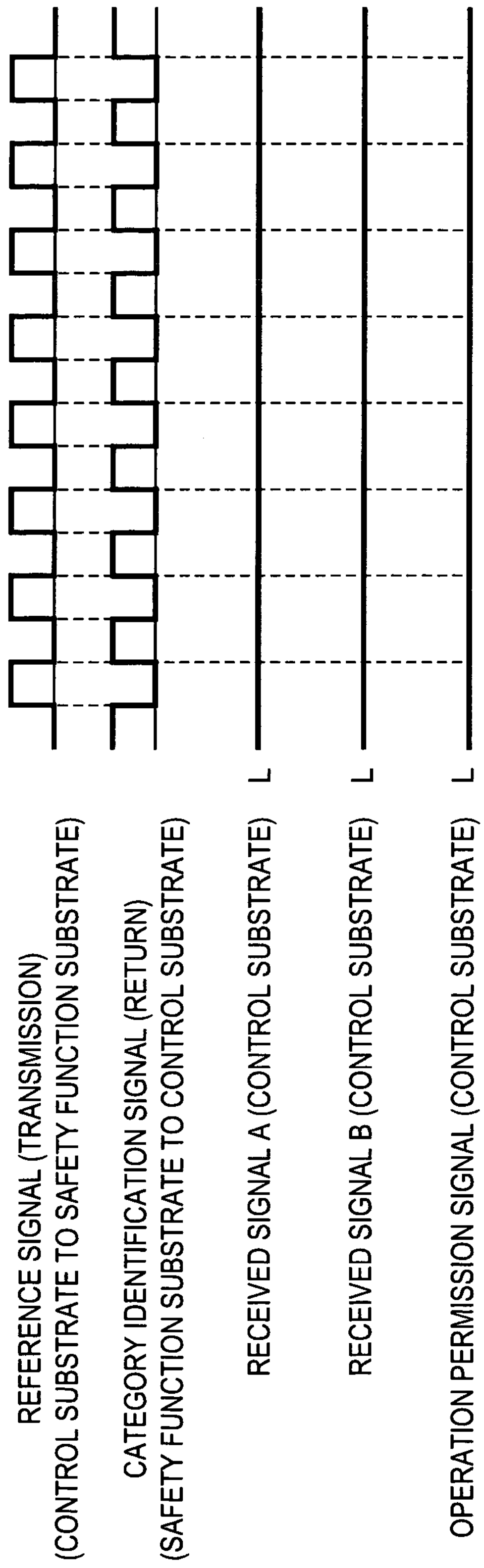
FIG. 8 is an illustration of an example 2 of operational waveforms when an inappropriate safety function substrate is connected in FIG. 3.

FIG. 8 is an example of operational waveforms when an inappropriate safety function substrate is connected to the control substrate 10 in the circuit shown in FIG. 3, and an inverted logic signal the inverse of the reference signal is returned. When an inverted logic signal the inverse of the reference signal is input, the output values (A and B) of the D flip-flops 62 and 63 of the control substrate 10 are both at the L level. For this reason, the output C of the EX-OR circuit 65, the operation permission signal, and the gate cutoff signal are at the L level. Because of this, the control substrate 10 can detect a safety function substrate connection abnormality and, by cutting off the gate circuit 12, can prohibit the operation of the semiconductor switching elements of the main circuit 30.

According to the working example, a substrate identification clock signal is transmitted from the category identifying circuit 13, the clock signal is input into each of the safety function substrates 20A and 20B, changed into a clock cycle unique to each substrate, and returned to the control substrate 10. The control substrate 10 receives the return signal, determines whether or not it is the cycle of the safety function substrate which should rightfully be mounted, and generates the operation permission signal and gate cutoff signal. The clock cycle unique to the safety function substrate corresponds to an identification code of the safety function substrate.

Working Example 2

Figure 9:
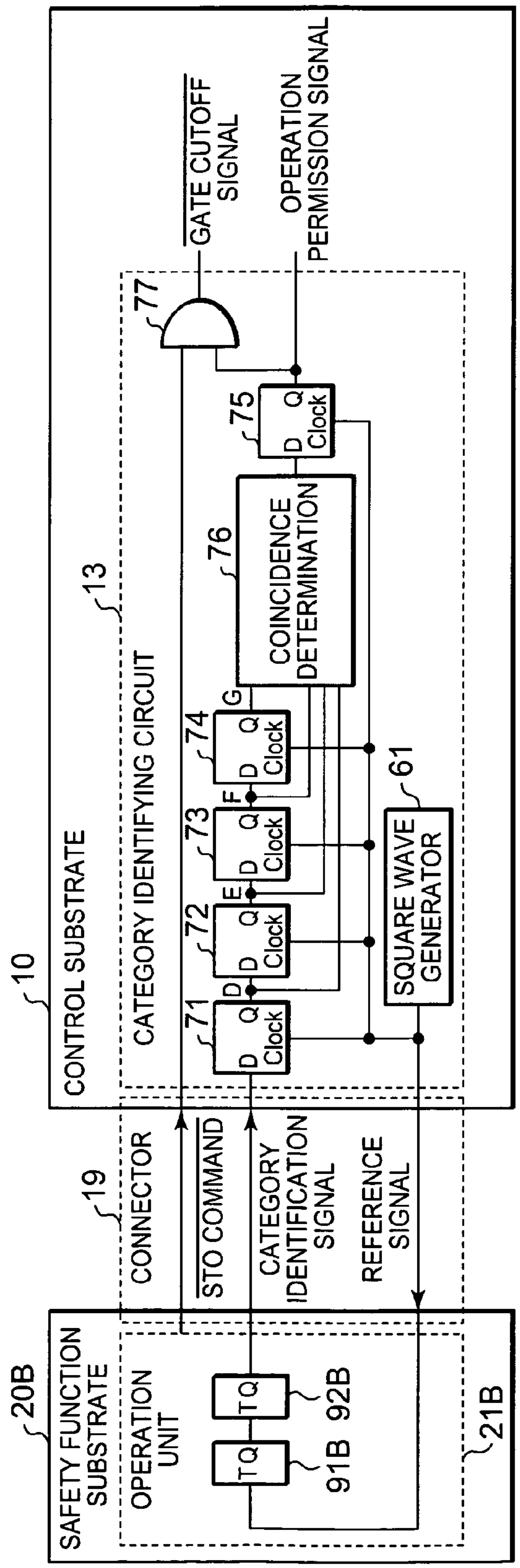
FIG. 9 is a circuit configuration diagram of a category identifying circuit according to a Working Example 2.

FIG. 9 is an example of a circuit when a case in which the return signal received by the control substrate 10 is of a cycle four times that of the transmission signal is defined as meaning that an appropriate safety function substrate is connected.

The category identifying circuit 13 shown in FIG. 9 is such that the return signal with a cycle twice that of the transmission signal in the circuit configuration of FIG. 3 is now a return signal with a cycle four times that of the transmission signal. The operation unit 21B of the safety function substrate 20B generates a signal with a cycle four times that of the received reference signal with T flip-flops 91B and 92B, and outputs it as a return signal. The category identifying circuit 13, on receiving the return signal, holds four clocks worth of signals with D flip-flops 71 to 74, and determines, with a coincidence determination circuit 76, whether or not outputs (D, E, F, and G) of each flip-flop coincide. The coincidence determination circuit 76 outputs at the H level in the event that the input signals from the D flip-flops 71 to 74 coincide with a predetermined signal pattern (in the working example, a signal pattern with a cycle four times that of the reference signal), and at the L level in the event that they do not coincide. A D flip-flop 75 holds the output of the coincidence determination circuit 76, and generates an operation permission signal. Also, in the same way as in FIG. 3, a gate cutoff signal is generated in accordance with the AND conditions of the operation permission signal and STO command.

Figure 10:
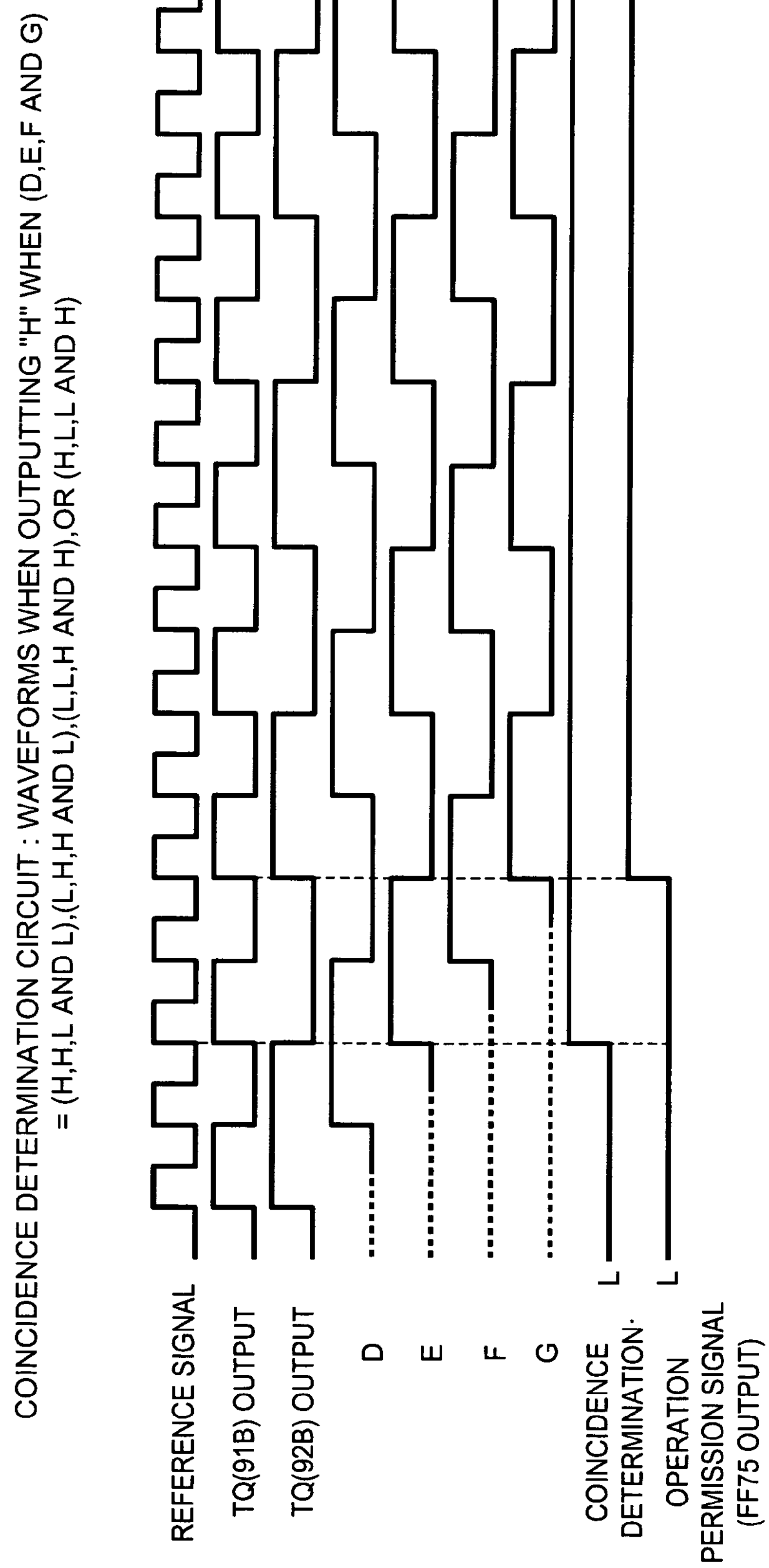
FIG. 10 is an illustration of an example of operational waveforms of the category identifying circuit of FIG. 9.

FIG. 10 is a timing chart of the category identifying circuit 13 of FIG. 9. The coincidence determination circuit 76 outputs at the H level when the outputs (D, E, F, and G) of the flip-flops 71 to 74 are (H, H, L, and L), (L, H, H, and L), (L, L, H, and H), or (H, L, L, and H). That is, when the outputs D to G are seen as being cyclical, the coincidence determination circuit 76 functions in such a way as to output "H" when two consecutive bits are "H" and two consecutive bits are "L", and to output "L" when there is another signal pattern. Because of this, the control substrate 10 can determine that the appropriate safety function substrate 20B is mounted.

Figures 11A, 11B:
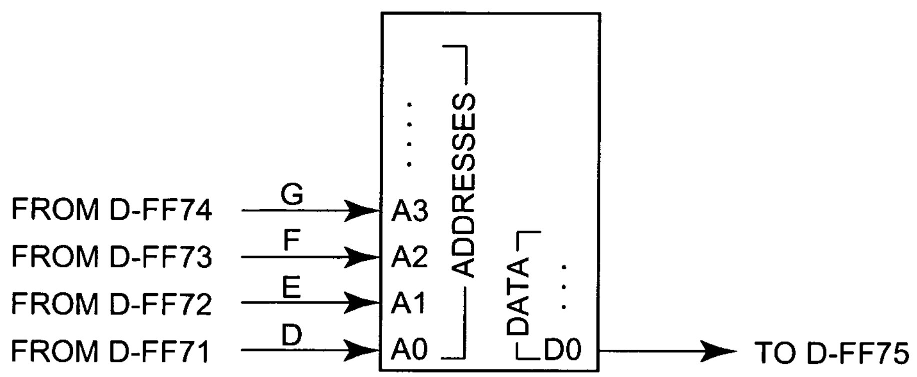
FIGS. 11A and 11B being an example of a coincidence determination circuit of FIG. 9.

Apart from the kind of ROM and EEPROM shown in FIG. 11A, the coincidence determination circuit 76 can also be realized with, for example, an ASIC or discrete logic circuit. Hereafter, a description will be given with a case of using an ROM as an example. In the case of realizing the coincidence determination circuit 76 with an ROM, a chip select signal or read signal for data output may constantly be put in an active condition, or data may also be output at a latch timing in the D flip-flop 75 using the reference signal from the square wave generator 61, or the like.

In FIG. 11A, the outputs of the flip-flops 71 to 74 are connected to addresses of the coincidence determination circuit 76. Empty addresses are fixed at the L level or H level. Then, a specific bit of data (D0 in FIGS. 11A and 11B) is set in such a way as to be "H" when address input signals coincide with a specific signal pattern corresponding to a substrate category, and "L" otherwise, as shown in FIG. 11B. By using an ROM onto which these data are written as the coincidence determination circuit 76, it is possible to realize the operation of the timing chart of FIG. 10. Of course, instead of using an ROM, it is also possible to configure with an ASIC, a logic circuit, or the like, which operates in accordance with the logic of FIG. 11B.

Working Example 3

Figure 12:
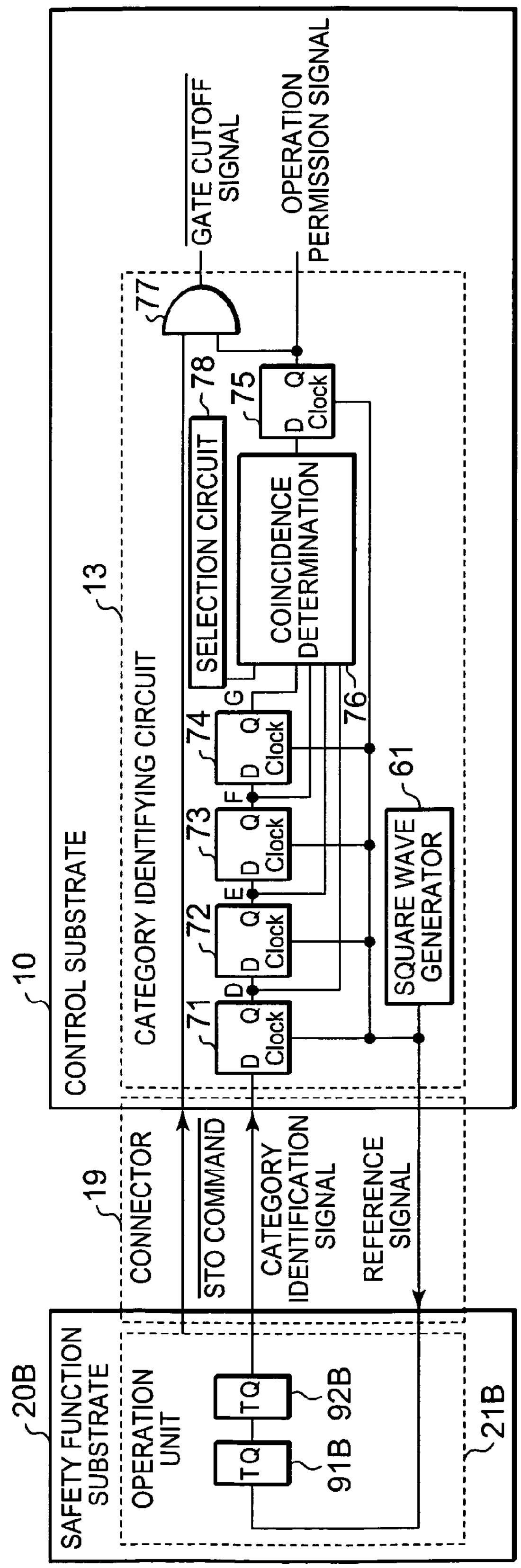
FIG. 12 is a circuit configuration diagram of a category identifying circuit according to a Working Example 3.

FIG. 12 is a working example wherein it is possible to select a safety function substrate with a switch mounted on the control substrate 10, and determine whether or not the correct safety function substrate is mounted.

The difference with FIG. 9 is that a selection circuit 78 is provided on the input side of the coincidence determination circuit 76. The coincidence determination circuit 76 determines whether or not the desired safety function substrate is mounted by changing the signal pattern to be used for the determination in accordance with a selection signal output from the selection circuit 78.

Figures 13A, 13B:
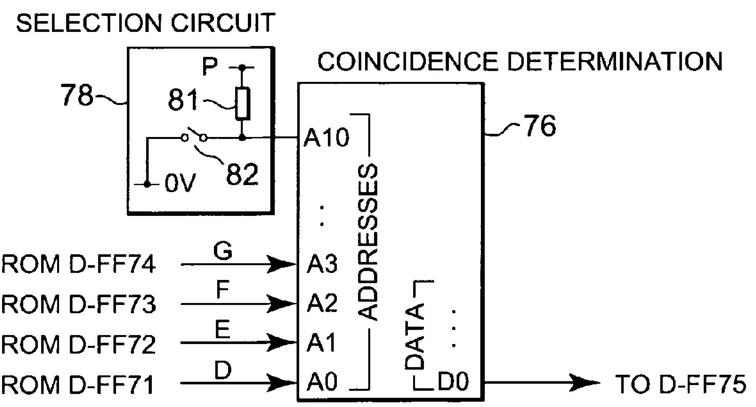
FIGS. 13A and 13B being an example of a coincidence determination circuit of FIG. 12.

FIG. 13A is an example of a circuit configuration of the coincidence determination circuit 76 and selection circuit 78 according to the embodiment. The selection circuit 78 is configured of a switch 82 and a pull-up resistor 81. Because of this, when the switch 82 is turned off, "H" is input into an address A10 of the coincidence determination circuit 76, and when the switch 82 is turned on, "L" is input into the address A10. Corresponding with this address, the data D0 corresponding to the safety function substrate 20B signal pattern of the addresses A0 to A3 are set at "H" when the address A10 of the ROM configuring the coincidence determination circuit 76 is "L", and set at "L" otherwise. Also, the data D0 of the addresses corresponding to the safety function substrate 20A signal pattern of the addresses A0 to A3 are set at "H" when the address A10 of the ROM configuring the coincidence determination circuit 76 is "H", and set at "L" otherwise. In the case of the working example, the relationship between the addresses and data is as shown in FIG. 13B.

Because of this, the safety function substrate 20A, which returns a category identification signal wherein the reference signal frequency is reduced by half, being detected when the selection circuit 78 is turned off, and the safety function substrate 20B, which returns a category identification signal wherein the reference signal frequency is reduced to one quarter, being detected when the selection circuit 78 is turned on, an operation permission signal is output when the appropriate substrate is mounted.

Working Example 4

In each of the heretofore described working examples, the STO command is transmitted from the safety function substrates 20A and 20B to the control substrate 10 separately from the category identification signal and, using this signal and the operation permission signal, the gate cutoff signal is generated on the control substrate 10 side, but with this working example, the pattern of the category identification signal is changed on the safety function substrate side when the STO command is emitted, and the STO command is detected from the category identification signal on the control substrate 10 side.

Figure 14:
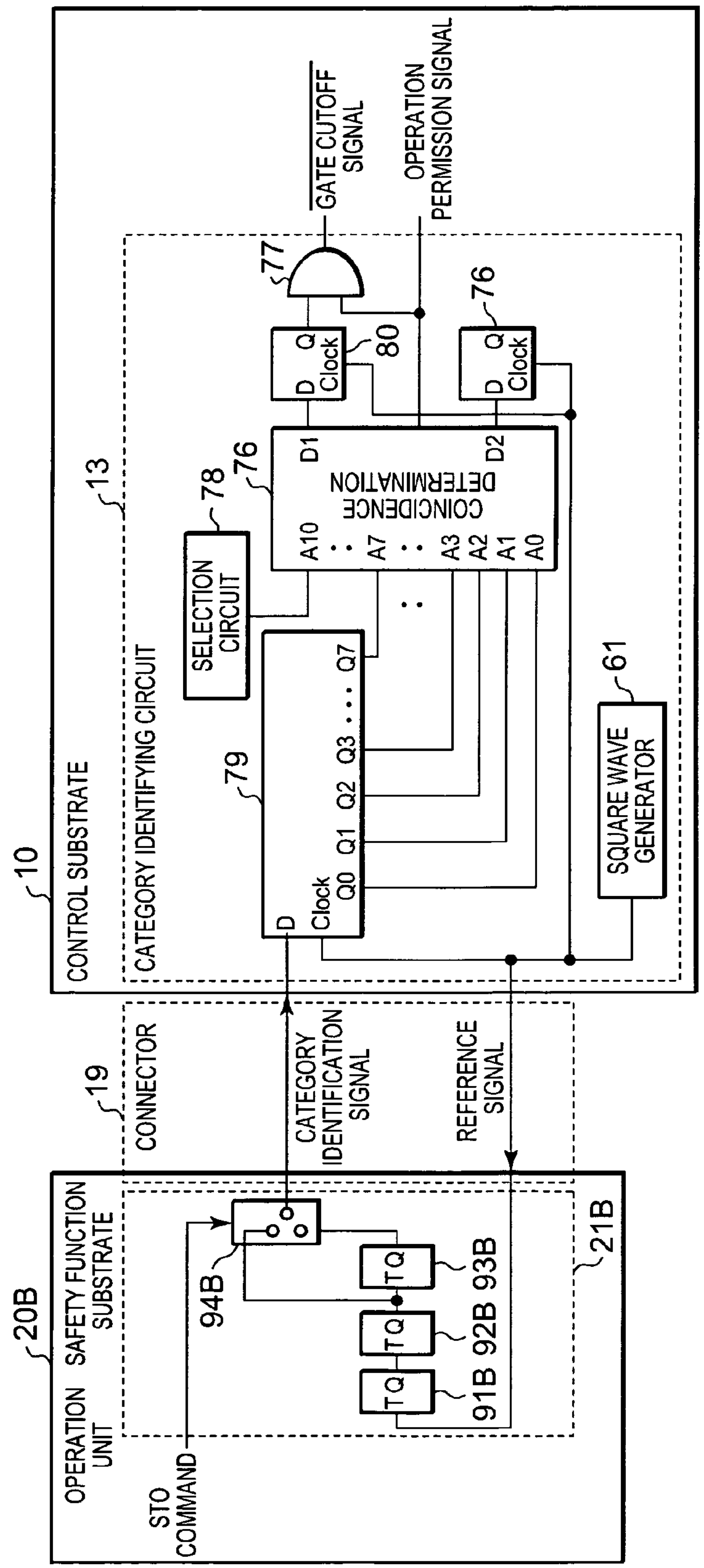
FIG. 14 is a circuit configuration diagram of a category identifying circuit according to a Working Example 4.

FIG. 14 is an example of a circuit configuration of the category identifying circuit 13 according to the working example. In the diagram, the safety function substrate 20B includes a switching circuit 94B which switches between the output of a T flip-flop 92B, which outputs a signal wherein the reference signal frequency is reduced to one quarter, and the output of a T flip-flop 93B, which reduces the reference signal frequency to one eighth. The switching circuit 94B selects the output of the T flip-flop 92B when no STO command is input, and the output of the T flip-flop 93B when an STO command is input, and returns them to the control substrate 10 as category identification signals.

The category identifying circuit 13 of the control substrate 10, having a shift register 79, sequentially shifts the input category identification signals in accordance with the reference signal from the square wave generator 61, and outputs them to outputs Q0 to Q7. The signals output from the shift register are input into the coincidence determination circuit 76.

It being possible to configure the coincidence determination circuit 76 with an ROM, or the like, a second data bit (D1) of addresses corresponding to the STO command signal pattern is set at "H". In the case of the working example, as a signal wherein the reference signal frequency is reduced to one eighth is returned when there is an STO command, when the outputs Q0 to Q7 of the shift register are seen as being cyclical, the data D1 of addresses wherein four consecutive bits are "H" and four consecutive bits are "L" are set at "H", and the data D1 of other addresses are set at "L". The settings of the data D0 are the same as in the Working Example 3. The data output from the data D0 and D1 of the coincidence determination circuit 76 are input into the D inputs of the D flip-flop 75 and a D flip-flop 80 respectively. The reference signal from the square wave generator 61 is input into the clock input of each of the D flip-flops 75 and 80. The output of the D flip-flop 75 is the operation permission signal. Also, the operation permission signal and an output signal from the inverted output terminal of the D flip-flop 80 are input into an AND circuit 77, the output of which is output as the gate cutoff signal.

In the category identifying circuit 13 configured in this way, when the category identification signal is input thereinto normally from the safety function substrate 20B, the output D0 of the coincidence determination circuit 76 becomes "H" and the D1 "L", the output of the D flip-flop 75 becomes "H", and the inverted output of the D flip-flop 80 also becomes "H". Because of this, the output of the AND circuit 77 becomes "H". As a result of this, the operation permission signal is in an active condition, and the gate cutoff signal is in an inactive condition.

When the STO command is output from the safety function substrate 20B in this condition, the output D0 of the coincidence determination circuit 76 becomes "L" and the D1 "H". As a result of this, the output of the D flip-flop 75 becomes "L", and the inverted output of the D flip-flop 80 also becomes "L". Because of this, the output of the AND circuit 77 becomes "L", the gate cutoff signal is in an active condition, and the gate circuit 12 is cut off.

According to the working example, as it is possible to transmit the category identification signal and STO command with the same signal line, it is possible to reduce the number of cables and number of buses.

Working Example 5

As another working example, the substrate category identification is also possible by causing the signals transmitted by the control substrate 10 to be emitted at constant cyclical intervals. By outputting a substrate category identification signal at intervals of a time shorter than the required operating time of a safety function required of the controlled instrument, and confirming that the appropriate safety function substrate is connected, it is possible to realize the required safety function.

Also, as it is possible to use a non-cyclic signal pattern for the substrate category identification signal by utilizing a signal with constant cyclical intervals, it is possible to apply a diversity of signal patterns.

Furthermore, by providing the safety function substrates 20A and 20B connected to the control substrate 10 with a delay unit which delays the signal by a certain time, the identification of the substrate category is also possible by the safety function substrates 20A and 20B returning a signal generated after delaying for a predetermined time as the category identification signal in response to the received reference signal. By determining a delay time tolerance range taking into account the delay time of the transceiver circuit, transmission line, and the like, as well as the delay unit delay time, and the control substrate determining the range of the return signal delay time, it is possible to confirm that the appropriate safety function substrate is connected. It is also possible to specify the delay conditions by phase. As an example of an inverted logic signal being returned, a signal waveform with a 180 degree delay is the same waveform as the category identification signal of FIG. 8.

Heretofore, according to the safety device according to the embodiment, by preparing a plurality of kinds of safety function substrate bearing safety functions, and using the safety function substrates by switching them in accordance with specifications, it is possible to easily realize an optimum safety device which meets the level of safety standards required by a client. Also, it is also possible to respond flexibly to a change in specifications.

In particular, the category identifying circuit of the control substrate activates the operation permission signal, enabling the control process, only in the event that the category of the connected safety function substrate is compatible with the safety function initially set in the control substrate. In the event that, furthermore, an STO command or other serious abnormality occurs, the category identifying circuit emits a gate cutoff signal, immediately cutting off the gate circuit. Because of this, it is possible to prevent a non-operation or malfunction of a safety function due to a connection error occurring when switching the safety function substrates, and furthermore, it is possible to control in such a way as to stop the controlled instrument promptly and reliably in response to a device failure, meaning that it is possible to construct a highly reliable system.

By generating the category identification signal using the methods according to the various working examples of the embodiment, it is possible not only to detect an erroneous mounting of a safety function substrate, but also to prevent a non-operation or malfunction of a safety function occurring due to the transmission lines of the category identification signal short circuiting.

Also, as it is possible, by making the category identification signal when requesting a compulsory torque off a signal differing from the signal at a normal time, to cause the category identification signal to perform the role of requesting the compulsory torque off, it is possible to reduce the number of signal lines, and it is possible to reduce the cost of the product.

The invention, not being limited to the heretofore described embodiment, can be realized with various modifications without departing from the scope thereof.

For example, in the Working Example 4, the STO command is also generated as a toggle signal with a duty ratio of 50%, wherein the frequency of the reference signal is reduced in the same way as with the substrate category identification signal, but it may also be generated as an optional, unique signal pattern based on the reference signal. In this kind of case, it is effective to realize the coincidence determination circuit with a non-volatile memory element such as an ROM, as described in the Working Examples 3 and 4. By inputting the category identification signals sampled with the reference signal as addresses, and presetting specific data bits of addresses corresponding to the signal pattern to be determined in the memory element, it is possible to easily detect the desired signal pattern.

What is claimed is:

1. A safety device comprising:

a controller which generates a control signal for controlling a controlled apparatus; and a safety function unit, connected to the controller, which executes a predetermined safety function, wherein the controller includes:

a unit which selects a category for identifying a safety function unit which should be connected, a unit which transmits to the safety function unit a reference signal for generating a category identification signal which enables identification of a category, the category identification signal being returned from the safety function unit to the controller, a unit which, based on the category identification signal returned from the safety function unit, determines whether or not the category of the connected safety function unit coincides with the selected category, and outputs the result of the determination, and a unit which, in the event that the result of the determination is such that the category of the connected safety function unit and the selected category do not coincide, prohibits the output of the control signal, wherein the reference signal is a pulse train having a predetermined frequency, wherein the safety function unit includes an operation unit which, based on the reference signal transmitted from the controller, generates the category identification signal in accordance with the category of the safety function unit, and returns it to the controller; and wherein the operation unit includes dividing means for receiving the pulse train and dividing it in frequency.

2. The safety device according to claim 1, wherein:

the dividing means generates a divided pulse signal having a frequency corresponding to the category of the safety function unit to the controller as the category identification signal.

3. The safety device according to claim 1, wherein the controller transmits pulses of the pulse train to the safety function unit at intervals of a time shorter than a required operating time of a safety function required of the controlled apparatus.

4. The safety device according to claim 1, wherein the safety function unit, in the event that it becomes necessary to immediately stop the controlled apparatus due to an input from the outside or an abnormality monitoring function, generates a signal differing from the category identification signal generated in accordance with the process appropriate to the category, and returns the signal to the controller as the category identification signal.

5. The safety device according to claim 1, wherein the dividing means comprises a flip-flop having an input terminal that receives the pulse train.

6. A power converter for use with a motor, comprising:

a main circuit which is provided with semiconductor switching elements, converts a direct current to an alternating current by turning on and off the gates of the semiconductor switching elements with the control signal, and supplies the alternating current to the motor;

a controller which generates control signals for driving the motor; and a safety function unit, connected to the controller, which executes a predetermined safety function to monitor for an abnormality, wherein the controller includes:

an operation unit which operates the control signal based on a command value of at least one of a position, speed, and torque of the motor input from the exterior;

a gate circuit which allows through or cuts off the output of the control signal, a unit which selects a category for identifying a safety function unit which should be connected, a unit which transmits to the safety function unit a reference signal for generating a category identification signal which enables identification of a category, the category identification signal being returned from the safety function unit to the controller, a unit which, based on the category identification signal returned from the safety function unit, determines whether or not the category of the connected safety function unit coincides with the selected category, and outputs the result of the determination, and a unit which, in the event that the result of the determination is such that the category of the connected safety function unit and the selected category do not coincide, prohibits the output of the control signal, wherein the reference signal is a pulse train having a predetermined frequency, wherein the safety function unit includes an operation unit which, based on the reference signal transmitted from the controller, generates the category identification signal in accordance with the category of the safety function unit, and returns it to the controller, wherein the safety function unit, in the event that it becomes necessary to immediately stop the motor due to an input from the outside or the abnormality monitoring of the safety function unit, transmits an emergency stop signal to the controller, wherein the controller, when receiving the emergency stop signal from the safety function unit, interrupts the control signal, without going through the operation unit, by turning off the gate circuit; and wherein the operation unit includes dividing means for receiving the pulse train and dividing it in frequency.

7. The power converter according to claim 6, wherein the dividing means comprises a flip-flop having an input terminal that receives the pulse train.

8. The power converter according to claim 6, wherein the dividing means generates a divided pulse signal having a frequency corresponding to the category of the safety function unit as the category identification signal.

* * * * *